Aug. 11, 1970 J. RUPPRECHT ET AL 3,523,832
THERMOGENERATOR WITH GERMANIUM-SILICON SEMICONDUCTORS
Original Filed June 8, 1966
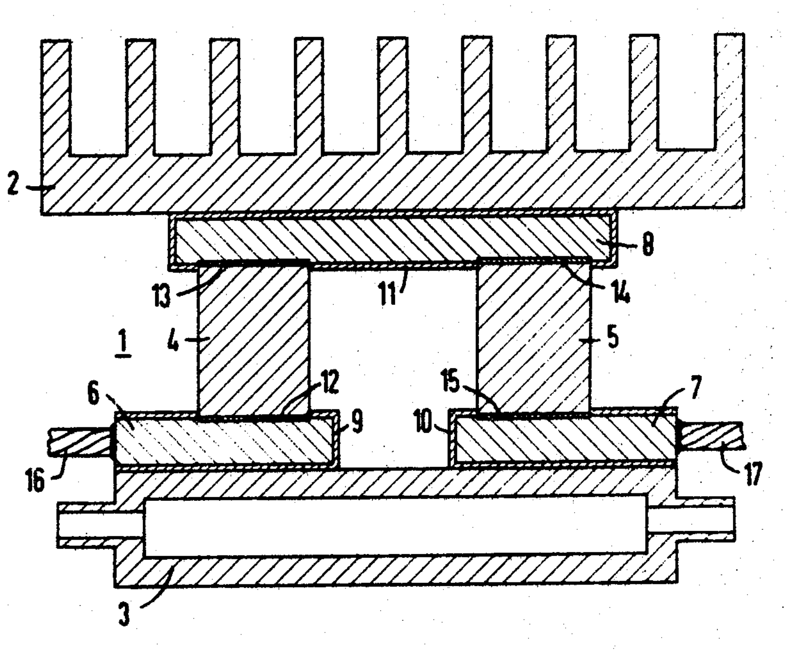

United States Patent Office 3,523,832 Patented Aug. 11, 1970

3,523,832

THERMOGENERATOR WITH GERMANIUM-SILICON SEMICONDUCTORS

Joachim Rupprecht, Nuremburg, Eugen Szabo de Bucs, Erlangen, and Gerhard Oesterhelt, Nuremburg, Germany, assignors to Siemens Aktiengesellschaft, a corporation of Germany Continuation of application Ser. No. 556,211, June 8, 1966. This application June 9, 1969, Ser. No. 834,595
Claims priority, application Germany, June 11, 1965, S 97,564
Int. Cl. H01v *1/16*
U.S. Cl. 136—205 1 Claim

ABSTRACT OF THE DISCLOSURE

A thermogenerator includes an electrical contact between a germanium-silicon semiconductor body and a metallic heat exchange body. The electrical contact is of a material selected from the group consisting of molybdenum disilicide, tungsten disilicide and silicon enriched variants thereof. The contact piece, with the exception of the contact point to the semiconductor body, has a coating of silicon oxides.

This is a continuation of application Ser. No. 556,211, filed June 8, 1966, now abandoned, and relates to an electrical contact between a germanium-silicon semiconductor body and a contact piece, especially for thermogenerators.

The contact piece of such devices may also serve as a terminal piece for an electric connection or, in thermocouples, as a portion of a contact bridge. The contact should have approximately the same coefficient of expansion as the semiconductor material, so that a temperature change of the contact does not produce excessive mechanical stresses. Furthermore, the contact piece must be resistant against an aggressive atmosphere. Finally, in many cases, the contact piece must be electrically insulated, so that it may be pressed against a metallic heat exchange body, for example, for cooling purposes.

An object of our invention is to produce an electrical contact of the above-described type, which answers all requirements. Such a device according to this invention, consists in a contact piece of molybdenum disilicide, tungsten disilicide or a silicon enriched variation of these materials coated, with the exception of the contact points, with silicon oxides.

The silicon oxide coating may be produced on contact piece material through heating. If, for example, molybdenum disilicide is heated quickly to about 1500° C. in an oxygen containing atmosphere, e.g. air, then molybdenum oxide evaporates from the surface of the body leaving behind a silicon surface layer, which oxidizes into silicon oxides.

The contact, according to the invention, not only fulfills the aforementioned requirements, but also possesses other essential, favorable characteristics. Since the contact piece contains a component of the semiconductor material, the contact points may, immediately after removal of the oxide layer, be bonded to the semiconductor body by alloying or fusing, without any additional solder, which could impair the electrical properties of the semiconductor. The contact piece, which is coated with the oxide layer, possesses a high resistance to temperature changes, great hardness and a high tensile strength. Hence, it is particularly suitable for thermoelectric generators. Tests have shown that the contact locality may be easily operated up to over 1000° C., so that thermogenerators afford a better degree of effectiveness than could be achieved with the previously known contact materials.

According to another feature of the invention, a layer or a mesh of tungsten or molybdenum is provided between the semiconductor body and the contact piece. This obstructs flow of semiconductor material into the contact piece during the fusion of the semiconductor body with the contact piece. This layer also provides a still better adjustment of the expansion coefficients between the semiconductor body and the contact piece.

The invention is disclosed in greater detail in the following specific example with reference to the drawing:

The single figure shows a thermogenerator 1 with a heat sink 2 for a gaseous medium at the hot contact point and a heat exchanger 3 for a flowing medium at the cold contact point. The thermogenerator has two thermolegs 4 and 5 of germanium-silicon semiconductor material. One of said legs is made p-conducting by a dopant, for example, boron, gallium or indium, the other one is n-conducting by a dopant, for example, phosphorus, arsenic or antimony. The contact pieces 6, 7 and 8 of the thermogenerator, of which the last is a bridge between the two legs, consist of molybdenum silicide. With the exception of the contact localities they have a coating 9, 10 and 11 of silicon oxides. Between the semiconductor bodies and the contact pieces, molybdenum layers 12, 13, 14 and 15 have been provided. The contact pieces 6 and 7 have electric leads 16 and 17.

Through the electrically insulated coating of silicon oxide, the electric circuit in a thermobattery may be made independent on the heat current path. Thus, for example, the thermolegs may be electrically in series and thermically in parallel.

The contact, according to the invention, is produced as follows:

Pre-formed contact pieces of molybdenum disilicide, tungsten disilicide or silicon enriched variants of these materials, are quickly heated to approximately 1500° C. Molybdenum or tungsten oxide evaporates from the surface of the body leaving behind a surface layer of silicon. The latter oxidizes and forms a glaze of silicon oxides. Subsequently to cooling, the surface areas to be contacted are mechanically freed from the glaze. The semiconductor legs are fused to the processed localities. The intermediate layers 12 to 15 are obtained by alloying in a foil or a mesh of molybdenum or tungsten prior to the fusion of the semiconductor legs.

We claim:

1. Thermogenerator with at least two thermolegs of germanium-silicon semiconductor material, which are contacted with at least one contact piece, said contact piece consisting of a material selected from the group consisting of molybdenum disilicide, tungsten disilicide and silicon enriched molybdenum disilicide and tungsten disilicide, said contact piece, with the exception of the contact point to the semiconductor body, having a coating of silicon oxides.

References Cited

UNITED STATES PATENTS

| | | | |
|---|---|---|---|
| 3,256,699 | 6/1966 | Henderson | 136—239 X |
| 3,342,567 | 9/1967 | Dingwall | 136—239 X |
| 2,902,392 | 9/1959 | Fitzen | 117—118 X |
| 2,955,145 | 10/1960 | Schrewelius | 136—239 |
| 3,086,886 | 4/1963 | Kieffer et al. | 117—114 X |
| 3,192,065 | 6/1965 | Page et al. | 117—118 X |

ALLEN B. CURTIS, Primary Examiner

U.S. Cl. X.R.

136—237